Aug. 11, 1936. J. K. ROBINSON 2,050,464

AUTOMOBILE TAG LOCKING DEVICE

Original Filed Aug. 8, 1935

Inventor

J. K. Robinson

By C. A. Snow & Co.

Attorneys.

Patented Aug. 11, 1936

2,050,464

UNITED STATES PATENT OFFICE 2,050,464

AUTOMOBILE TAG LOCKING DEVICE

James K. Robinson, Tampa, Fla., assignor, by direct and mesne assignments, of one-half to E. W. Myers, Tampa, Fla.

Application August 8, 1935, Serial No. 35,388
Renewed June 18, 1936

3 Claims. (Cl. 40—2.2)

This invention aims to provide a novel means whereby a license tag may be fastened on an automobile in such a way that it will be practically impossible to remove the tag without mutilating the tag, counterfeiting of tags and shifting of tags being avoided. The invention aims to improve both the mechanism whereby the tag is held on the tag bracket and mechanism whereby the tag is mutilated when an attempt is made to remove it, the mechanism which mutilates the tag carrying an indicator which identifies the tag as being valid.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
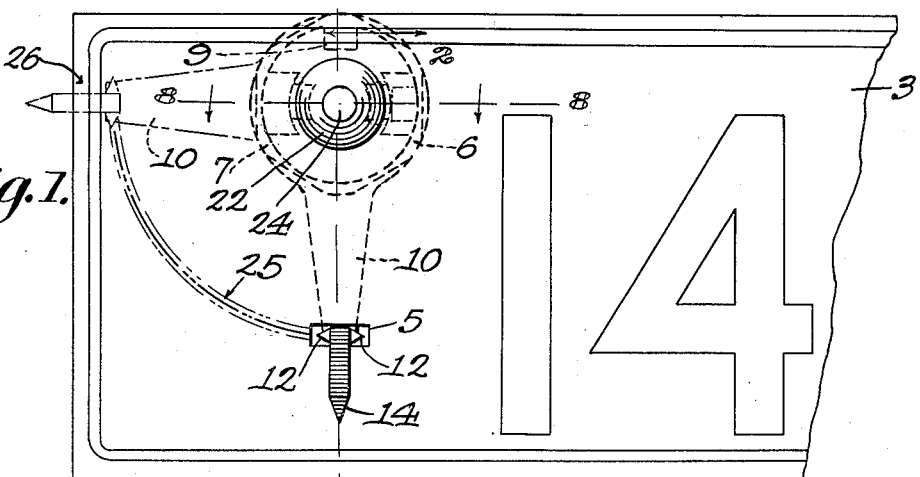
Fig. 1 shows in rear elevation, a portion of a tag wherewith the device forming the subject matter of this application has been assembled.
Figure 2:
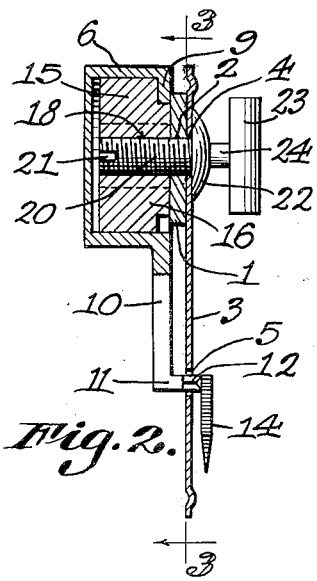
Fig. 2 is a section on the line 2—2 of Fig. 1.

The numeral 1 marks a bracket of the kind found on motor cars, and used for holding a license tag 3. Bracket 1 has several slots 2, but one of which is shown in the drawing. The license tag 3 has holes 4 that can be brought into registration with the slots 2 of the tag bracket 1. A bolt or the like (not shown) is used, according to the common and present practice, to hold the license tag 3 on the bracket 1. The bolt passes through the hole 4 of the license tag 3 and through the slot 2 of the bracket 1. The bolt or the like is replaced by the device forming the subject matter of this application. The license tag 3 is provided with a longitudinally elongated slot 5 disposed below one of the holes 4 in the tag 3.

The device forming the subject matter of this application includes a casing 6. Internally, and at its rear end, the casing 6 is circular, as shown at 7. It may be remarked here that it is presumed that the operator is behind the car, looking toward the forward end of the car, such terms as "front" and "back" being selected accordingly throughout this specification. The casing 6 has a hexagonal part 8 adapted to receive a wrench (not shown). At its rear end, the casing 6 has a retaining finger 9, extended toward the horizontal axis of the casing. At its rear end, the casing 6 is supplied with a depending arm 10. The arm 10 has a rectangularly disposed, rearwardly extended portion 11. The part 11 of the arm 10 is provided with oppositely disposed cutting edges 12. The part 11 terminates in a depending indicator 14, which may be of any desired color, the color of the indicator 14 preferably differing from that of the tag 3.

Figure 3:
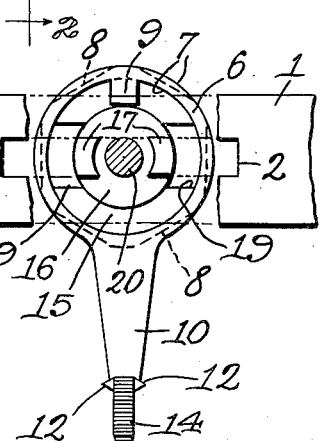
Fig. 3 is a section on the line 3—3 of Fig. 2.
Figure 4:
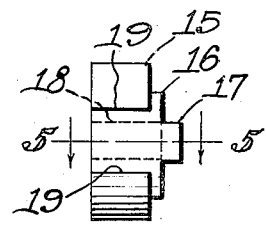
Fig. 4 is a side elevation of the nut.
Figure 5:
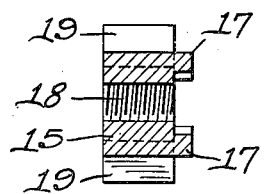
Fig. 5 is a section on the line 5—5 of Fig. 4.
Figures 6, 7:
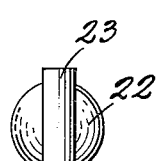
Fig. 6 is a side elevation of the screw.
Fig. 7 is an end elevation of the screw.
Figure 8:
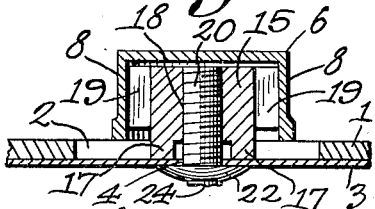
Fig. 8 is a section on the line 8—8 of Fig. 1.

The numeral 15 marks a circular nut. The nut 15 has a rearwardly projecting, reduced neck 16. There are oppositely disposed, rearwardly projecting lugs 17 on the neck 16. The nut 15 is provided with a threaded bore 18. Slots 19 are located in the edge of the nut 15 and are oppositely disposed, the slots extending through the nut from front to back. The slots 19 are disposed outwardly of the lugs 17, as Fig. 3 will show.

The numeral 20 marks a securing element, such as a screw. The screw 20 has a screw driver kerf 21 in its forward end. The screw 20 is provided with a head 22. The head 22 is disk-like, convexed, and of such shape that a hold cannot be attained upon it, by a wrench, screw driver or the like. The screw 20 includes a turning member or cross piece 23. The cross piece 23 is connected to the head 22 by a reduced stem 24. The stem 24 is weak enough so that it can be twisted apart, if a reasonably strong torsion is exerted upon it.

To assemble

Place the nut 15 in such position that one of the slots 19 of the nut is in registration with the retaining finger 9 of the casing 6. Slide the nut 15 into the casing 6. Turn the nut 15 in the casing 6 until the slot 19 of the nut is out of registration with the finger 9 of the casing 6, as in Fig. 3. The finger 9 then overlaps the rear end of the nut 15 and holds the nut in the casing 6. Place the tag 3 against the rear surface of the bracket 1. Insert the part 11 of the arm 10 through the slot 5 of the tag 3, the indicator 14 then showing behind the tag, as in Fig. 1. Insert the lugs 17 of the nut 15 into the slot 2 of the tag bracket 1, the nut 15 thereby being held against rotation. By means of the part 23, turn the screw 20 into the bore 18 of the nut 15 until the head 22 of the screw binds the tag 3 tightly against the rear surface of the bracket 1, and until the end of the neck 16 of the nut is bound against the forward surface of the bracket 1. Continue the turning process until the stem 24 breaks, leaving nothing exposed by which the screw 20 can be backed out of the nut 15 by any operation short of reshaping the head 22 to take a screw driver or a wrench, such a reshaping being impractical.

*To take down*

Put a wrench on the hexagonal part 8 of the casing 6 and rotate the casing until the finger 9 on the casing registers with one of the slots 19 in the nut 15. This operation swings the arm 10 up into the horizontal position of Fig. 1. When the arm 10 swings up into the horizontal position of Fig. 1, one of the cutting edges 12 on the part 11 of the arm 10 forms a slot 25 in the tag 3. The tag 3 thus is ear-marked and mutilated, to such an extent that it cannot be used again. With a pair of pliers or the like, break the tag 3 near to its left hand end in Fig. 1, about at the place marked by the arrow 26. This lets the indicator 14 pass forwardly through the tag 3. Slide the casing 6 forwardly off the nut 15, the finger 9 of the casing 6 then being in such a position that it can pass forwardly through one of the slots 19 of the nut 15. The casing 6 now is free from the nut 15, and the screw driver kerf 21 of the screw 20 is exposed. Put a screw driver into the kerf 21 and thread the screw 20 out of the nut 15, thereby releasing the mutilated tag 3 from the bracket 1.

The procedures specified for assembling and taking down need not be followed exactly as set forth, but they represent, each, one satisfactory method of proceeding to the end desired.

It may be prescribed by law that no license tag on a car shall be considered valid unless the indicator 14 appears behind the license tag. Therefore, a traffic officer will know that a tag not characterized by the indicator 14 is not a lawful tag. After the device once has been assembled, it cannot be taken down without cutting the slot 25 in the tag 3 and the tag, thus, is mutilated to such an extent that it can be recognized by casual inspection, and cannot be shifted from car to car. Even if an unrecognizable counterfeit of the tag 3 is made, the tag can be noted to be void, unless it is characterized by the pointer mechanism shown at 14, and counterfeiters of tags will not proceed with their work, when they know that they must duplicate not only the tag, but, as well, the mechanism that holds it in place.

What is claimed is:

1. A holder for a license tag, embodying a nut, a screw provided at one end with detachable means for threading it into the nut, and provided at its opposite end with means for threading it out of the nut, a casing enclosing the nut and rendering the last-specified means inaccessible, the casing and the nut having interengaged parts which hold the casing on the nut until the casing has been rotated to a predetermined position, the casing having an arm which carries an indicator characterizing the tag which is held, and the arm being provided with means for mutilating the tag when the arm moves toward said predetermined position.

2. A holder for a license tag, constructed as set forth in claim 1, in combination with means on the nut for engagement with a tag bracket to hold the nut against rotation whilst the screw is being threaded into the nut.

3. A holder for a license tag, constructed as set forth in claim 1, and further characterized by the fact that the means for mutilating the tag is a cutter, offset from the arm so as to pass through the tag and effective to slit the tag when the casing is rotated in either of opposite directions.

JAMES K. ROBINSON.